United States Patent [19]

Cucchi et al.

[11] Patent Number: 4,610,591
[45] Date of Patent: Sep. 9, 1986

[54] METAL BAR FEED CONTROL DEVICE FOR THE FEEDING OF AN AUTOMATIC MULTIPLE-SPINDLE LATHE

[75] Inventors: Giovanni Cucchi; Pietro Cucchi, both of Bussero, Italy

[73] Assignee: F.lli Cucchi S.r.l., Bussero, Italy

[21] Appl. No.: 601,777

[22] Filed: Apr. 19, 1984

[30] Foreign Application Priority Data

Apr. 21, 1983 [IT] Italy .................. 20706 A/83

[51] Int. Cl.[4] .............................. B23Q 5/22
[52] U.S. Cl. ...................... 414/14; 74/112; 192/48.7
[58] Field of Search ............ 414/14; 82/70, 2.5, 82/2.7; 74/112, 125.5; 192/48.7, 48.8, 93 C, 96, 48.1

[56] References Cited

U.S. PATENT DOCUMENTS 1,227,910 5/1917 Hubbard et al. .............. 192/96
3,722,305 3/1973 Walters et al. ............... 74/125.5
3,917,143 11/1975 Yourkievitz ................ 414/14 X
4,163,514 8/1979 Ramunas ...................... 414/14 X Primary Examiner—Robert J. Spar
Assistant Examiner—Dennis Williamson
Attorney, Agent, or Firm—Seidel, Gonda, Goldhammer & Abbott

[57] ABSTRACT

A control device for feeding metal bars to guide equipment for feeding an automatic multiple-spindle lathe. The device consists of a series of drive shafts, each of which accounts for the feeding of a bar. The shafts are equal in number to the lathe spindles and are placed in a drum that rotates synchronously with the lathe spindle holding drum. Each of these shafts can be coupled with a drive element when a certain length of bar is to be fed. The coupling takes place through engaging and disengaging parts mounted between the shaft and the drive element. Each shaft controls at least one gear for feeding a bar, through a chain or the like provided with a bar-pusher, when the shaft is made to turn. The gear can be moved to make the device usable with lathes having different spindle center distances.

19 Claims, 10 Drawing Figures

METAL BAR FEED CONTROL DEVICE FOR THE FEEDING OF AN AUTOMATIC MULTIPLE-SPINDLE LATHE

BACKGROUND OF THE INVENTION

This invention regards a device for controlling the feeding of metal bars that have to be taken, through a proper guide equipment, to a multiple-spindle lathe.

In the aforesaid kind of lathes, unlike single-spindle lathes, succeding machining operations on workpieces are carried out, as it is known, by taking the workpieces sequentially to the tools or tool assemblies making up each working station. Therefore, in a multiple-spindle lathe the spindles are held by a fundamentally circular rotating drum, on which the spindles are at the same distance between one another, arranged angularly along a circumference.

These lathes are fed through appropriate guide equipment that is placed adjacent the lathe and consists basically of a series of tubular guides. The latter, too, are situated along a circumference, on the same longitudinal axis as the lathe spindles, and they are held by a turning frame that rotates synchronously with the spindle-holding drum.

The device that is the object of this invention is meant for the control of the feed of metal bars through the aforesaid guide equipment to the lathe, particularly into its spindles.

The brief description herein made of a multiple-spindle lathe and of guide equipment aims only at making this specification more complete and the features of this invention better understandable. In fact, the lathe and the guide equipment are not the object of this invention.

Finally, for a better comprehension of how the invention works, it is to be noted that the bar feed is not steady, but the bars jog and are fed according to the length required to make a new piece.

There are several devices for controlling the feed of bars to a multiple-spindle lathe as specified hereinbefore.

In a first type of these devices the bar-pushers to push bars into the guides are driven by only one drive motor, which turns a series of shafts, arranged on a drum substantially in a star-like manner, by means of a system of bevel gear pairs. The aforesaid drum rotates synchronously with the lathe drum. A pulley is splined to each shaft, and a steel-wire rope, to which a bar-pusher is fixed, is wound around this pulley. When the spindles stop the bars, there is the friction slip of the steel-wire ropes on the pulleys of the various shafts, since the bar cannot be fed any more. This leads to a high degree of wear concerning both the pulleys and the steel-wire ropes.

Another negative aspect of this device is that all ropes shall always be perfectly stretched in order to avoid sliding, which would prevent the bar from being fed, when the corresponding spindle is opened to allow the traverse of the former. That could bring about insufficient feeding, i.e. a length is fed that is less than that of the piece to be made, or even no feeding takes place. Therefore, besides the disadvantages first above described, the above mentioned device cannot be relied upon and requires steady maintenance, which implies that the lathe shall be inoperative for remarkable spans of time. That is extremely negative taking into account that the best output of a multiple-spindle lathe can be got only by minimizing its downtime.

Another known device is provided with a series of feed shafts arranged so as to resemble a star on a rotating drum. Each shaft is furnished with ts own motor reducer with clutch, which is operated whenever the corresponding bar has to be fed. This kind of device is extremely difficult to be built both because of the need of various drive motors and owing to the uneasy power supply of these motors applied to a turning drum. It goes without saying that the electric systems of these devices turn out to be complicated and prone to failures, which compel to stop the lathe, thus reducing its output rate as defined hereinbefore.

Both types of above mentioned devices are characterized also by the common disadvantage that they can be used only for one type of lathe, namely that where the spindle centre distance is the same as the centre distance of the bar feed controlling devices. It means that they cannot be used for a lathe where the spindle distance from the rotation centre of the drum is different from the distance of the pulleys or of the gears of the motor reducers from the rotation centre of their drum. This leads to the need of building a specific bar feed device for each lathe with a certain centre distance, as first above defined.

The disadvantages so far mentioned can be eliminated thanks to the subject of this invention, i.e. a device for controlling the feeding of metal bars to a multiple-spindle lathe.

BRIEF DESCRIPTION OF THE DRAWINGS

The features and the advantages of the device according to this invention can be found in the following detailed description of a non limiting embodiment of the device itself, made with reference to the attached figures, of which;

FIGS. 4a and 4b are an enlarged representation of sections V—V and VI—VI of FIG. 4;

DESCRIPTION OF THE PREFERRED EMBODIMENTS

With reference at first to FIGS. 1 through 4 the first embodiment of the device object of this invention will be described.

Figure 1:
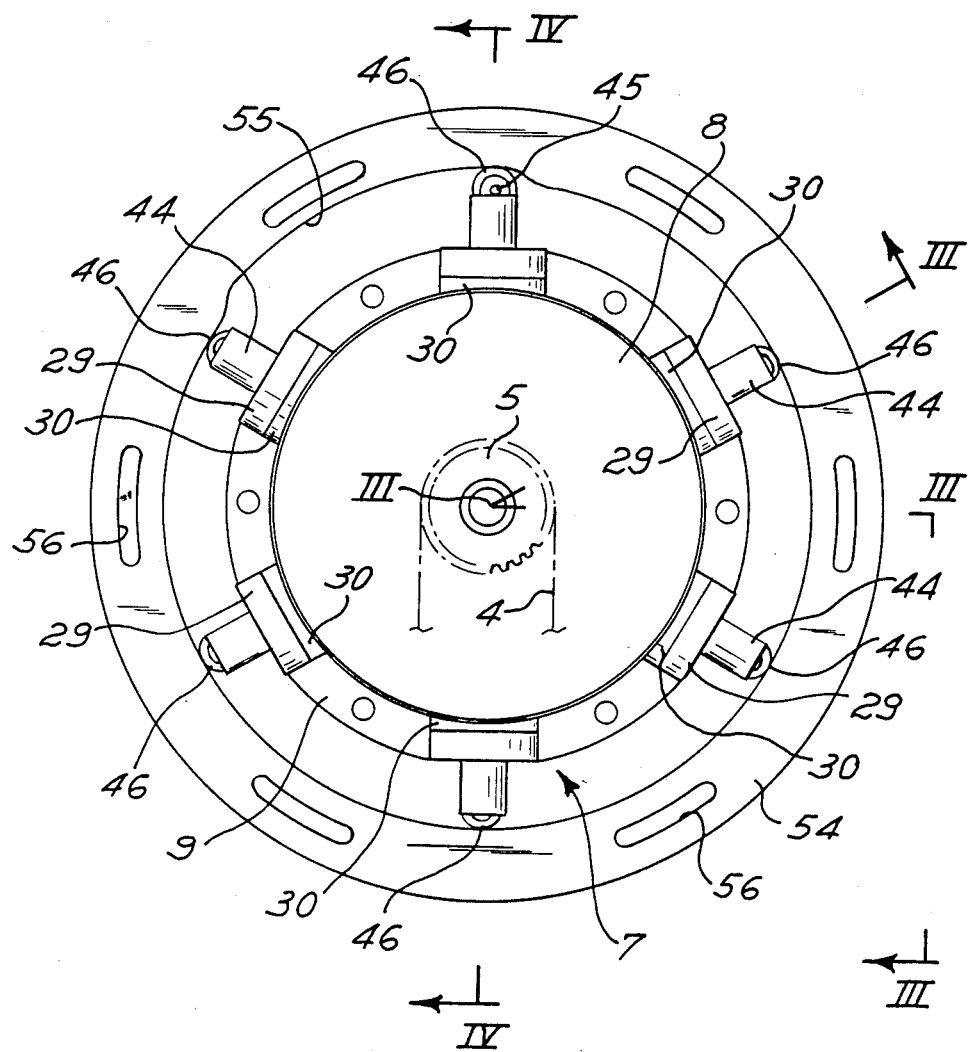
FIG. 1 is a front view of the device on the side opposite to that where the metal bar guide equipment is situated.
Figure 2:
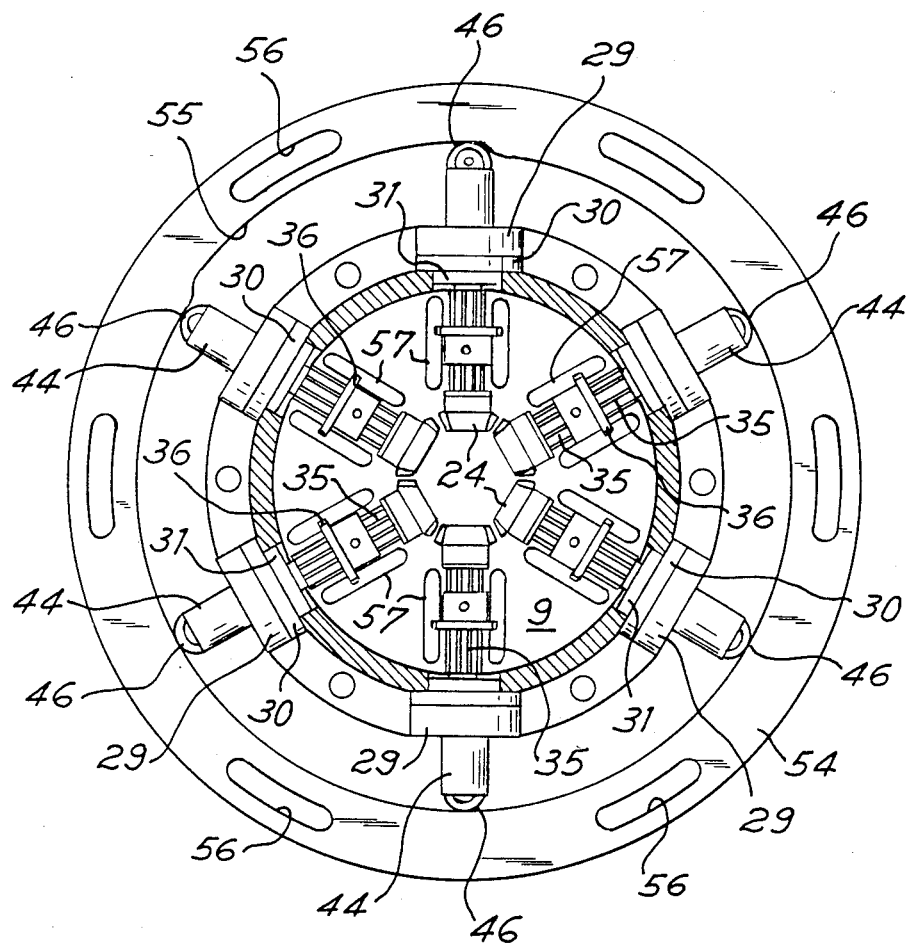
FIG. 2 is a view of the device on the same side as FIG. 1, where a front plate is lacking in order to show its middle cross section.
Figure 3:
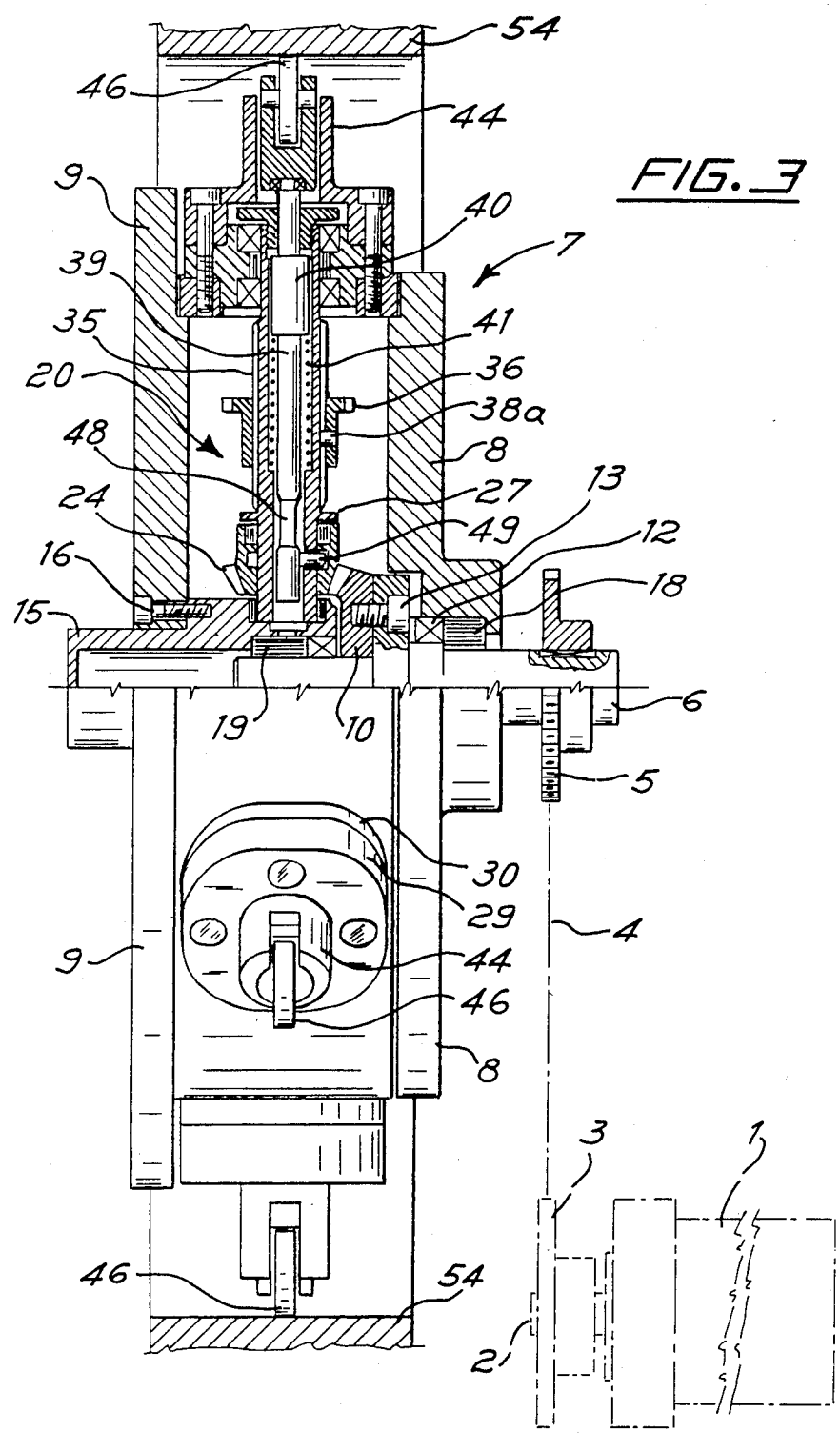
FIG. 3 is a view of the device as per section III—III of FIG. 1.
Figure 4:
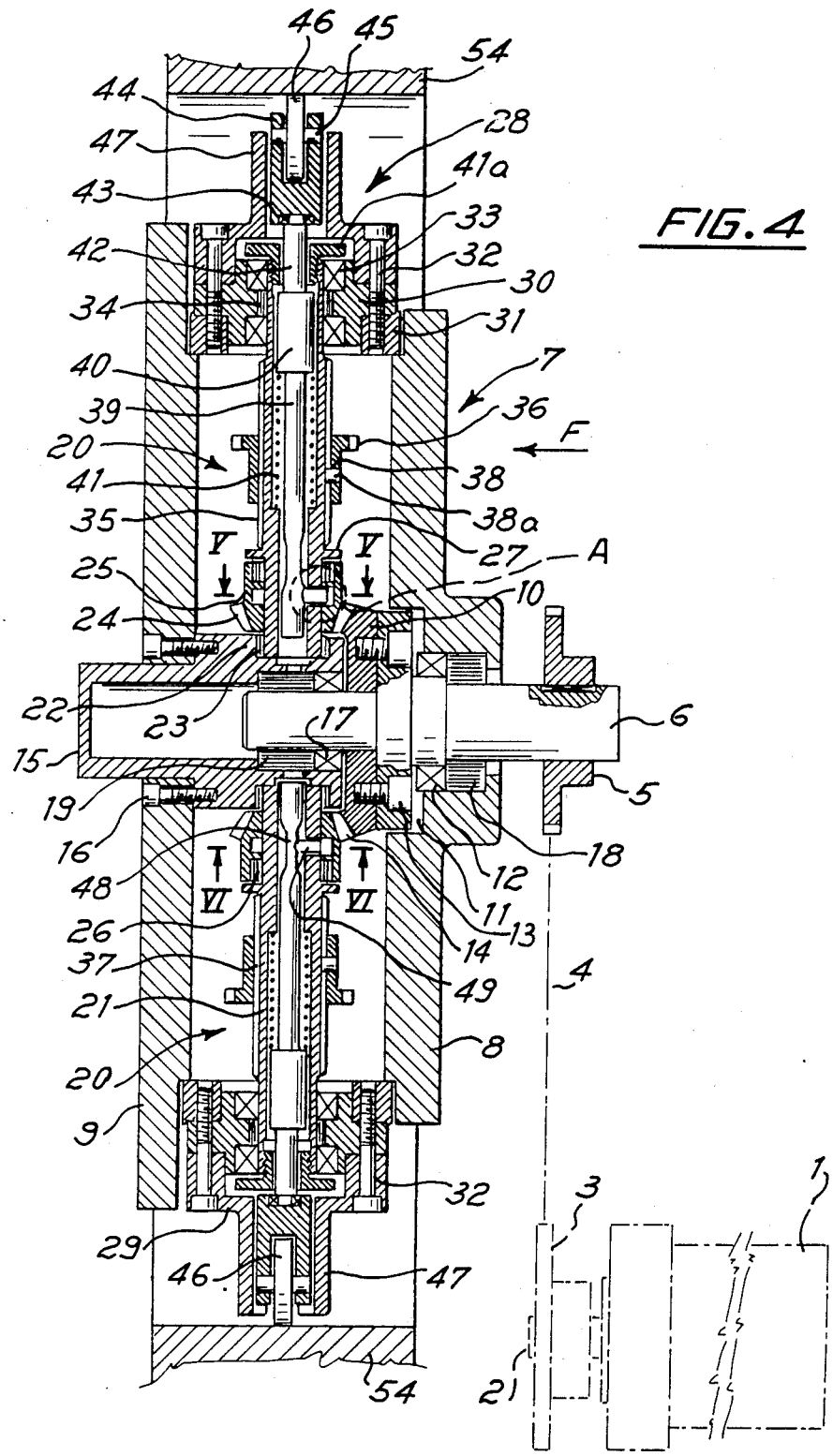
FIG. 4 is a view of the device as per section IV—IV of FIG. 1.

However, it is to be defined before the position of the device as against the metal bar guide equipment and the lathe. The device is situated at the rear end of the metal bar guide equipment, and (see FIG. 4) this equipment and the lathe are series-connected to each other on the left side of the device, as shown in FIG. 4. The views of FIGS. 1 and 2 are to be seen as per the sense of arrow F in FIG. 4.

The device object of this invention includes a driving unit 1, consisting of a motor reducer with clutch of known type, to shaft 2 of which a gear 3 is splined, that is connected, through a chain 4 schematically shown with a chain line, to a gear 5 splined to a shaft 6. Shaft 6 is partially situated inside a basically cylinder-shaped body or drum 7, the main parts of which are a first flange 8, which can be considered as the rear flange since it is placed on the side opposite to the bar guide equipment, and a front flange 9 which are integral with each other in any known way, not shown herein. Drum 7 is made integral with the bar guide equipment, exactly with the drum of the guide equipment which makes the bar guides turn, therefore drum 7 rotates synchronously with the aforesaid equipment and consequently with the lathe spindle drum.

In a basically central part of device drive shaft 6 there is a circular radial projecting part 10 that can rotate freely in a seat 11, made on the inner face of rear flange 8.

Corresponding to projecting part 10 of shaft 6 there is a ball bearing 12, which allow the free turning of shaft 6 as against drum 7.

A circular crown gear 14 with fundamentally front teeth is fixed on radial projecting part 10 of shaft 6: this crown gear rotates together with shaft 6.

A sleeve body 15 is situated on the same axis as shaft 6, at the end opposite to that on which gear 5 is splined; sleeve body 15 is fixed to front flange 9 through locking screws 16. At its end inside drum 7 sleeve body 15 acts as a support of shaft 6 through ball bearing 17. Shaft 6 is supported by drum 7 and by sleeve body 15 through oilless bushings 18 and 19.

Inside drum 7, around sleeve body 15, the control units are disposed, which are situated radially in a star-like manner. Each of these units is indicated by the numeral 20 and controls the feed of a metal bar, when it is operated, that is connected to shaft 6.

Only one of control units 20 will be described, since they are all identical. In the embodiment shown of the device which is the object of this invention the control units are six in number, because the device is supposed to be used for a six-spindle lathe, but it goes without saying that there is no limit to their number.

Here follows the description of control unit 20 that is situated in the upper part of FIG. 4. The unit is working, i.e. it is controlling the feed of its corresponding bar, as will turn out to be clearer in this specification.

Control unit 20 includes a longitudinally hollow shaft 21, the lower end of which is situated in an appropriate seat 22 of sleeve body 15 in an oilless bushing 23. Corresponding to the lower end of hollow shaft 21, there is a bevel gear 24, which has the same axis as shaft 21. Bevel gear 24 is always in mesh with circular crown gear 14, therefore it is always turning. Bevel gear 24 has an upper cylindrical extension 25, and between the latter and shaft 21 there is an oilless bushing 26. Over gear 24 shaft 21 is provided with a radial projecting part 27 to keep gear 24 in the position in which it is in mesh with circular crown gear 14.

The upper end of shaft 21 is inserted in a unit 28 that allows the shaft to turn through the mechanisms hereinafter described, when it is operated, as explained in the following part of the description, in order to control the feed of a bar.

Unit 28 includes a fundamentally cylindrical outer flange 29, a circular middle flange 30 and an annular inner flange 31. These three flanges are fixed to one another through locking screws 32, and inner flange 31 shall be fixed also to drum 7 in any known way.

Middle flange 30 is provided with a substantially cylindrical, longitudinal passage and with ball bearing 33, placed in its appropriate seats, that, together with an oilless bushing 34, account for the turning of shaft 21.

The longitudinal part of shaft 21, from the lower edge of inner flange 31 to its radial projecting part 27, has a series of fundamentally longitudinal ribs 35, which can be better seen in FIG. 2; these ribs are situated all around the side surface of the shaft. A gear 36 is mounted on this part of shaft 21, and gear 36 has a cylindrical part 37, which is furnished with a radial passage 38 to insert a locking screw or security dowel 38a. Gear 36 and its cylindrical part 37 have some grooves on their inner surfaces, grooves that correspond to the shape of ribs 35 of shaft 21, so that gear 36 can be moved along shaft 21 and locked in the desired position through dowel 38a. In this way gear 36, around which the chain controlling the bar-pusher is wound, can be moved and adjusted according to the centre distance of the guides, i.e. according to the lathe spindle centre distance. Gear 36 is thus adapted to provide the motive power for the drive chain of an automatic feeder for a multiple spindle machine such, for example, as is shown in U.S. Pat. No. 3,874,519.

Inside hollow shaft 21 there is a sliding pin 39 which is engaged, through its biggest part 40, with a spring 41, the other end of which is engaged with a step-shaped inner projecting part 42 of shaft 21. Spring 41 is under pressure, so that it pushes pin 39 towards the outside of shaft 21, or more precisely towards the outside of drum 7. During the assembly of the device, pin 39, and particularly its biggest part 40, abuts against a bushing 41a screwed on the upper end of shaft 21. This bush is meant to prevent pin 39 of shaft 21 from coming out.

Upper end 42 of pin 39 is engaged through a thrust bearing 43, with an element 44 on which a wheel 46 is mounted on a pin 45 in such a way that it can turn. Element 44 can be longitudinally moved in a slit in a cylindrical part 47, projecting over upper flange 29. In this way element 44, and therefore wheel 46, move together with pin 39, sliding inside hollow shaft 21.

As it appears from FIG. 4, pin 39 has a zone or segment with a smaller diameter 48 near its lower end. The ends of this zone are radiused to the rest of pin 39. Therefore the latter, through the two flared parts connecting the cylindrical part with a greater diameter to the cylindrical part with a smaller diameter, shows a reduced-diameter zone, the function of which is described in the following.

When pin 39 is moved radially towards the inside of drum 7, reduced diameter zone 48 is engaged with a pawl or mobile key 49, which is the mobile part for connecting and disconnecting shaft 21 from gear 24.

In the embodiment shown, only one mobile key 49 is scheduled, but it goes without saying that more than one mobile key (e.g. two or three) can be scheduled, which have to be distributed evenly around pin 39. Of course, the diameters of pin 39 and of smaller-diameter zone 48 shall be of such a value as to avoid any interference among the mobile keys.

With reference now to FIGS. 4a and 4b, which show a cross section of shaft 21 in correspondance of pawl 49, it is described how aforesaid mobile key 49 engages or disengages reciprocally shaft 21 and gear 24.

The two conditions mentioned just now can be seen in FIG. 4 respectively for the upper control unit, which is working, and for lower control unit 20, which is not working. FIGS. 4a and 4b are cross sections, showing the same conditions.

When a control unit is working, as is upper control unit 20 shown in FIG. 4a (cross section), key 49 is engaged basically with the lower end of pin 39, i.e. outside its smaller diameter part 48. In such position key 49, particularly its part 49a which is basically cylindrical, is inserted in a corresponding recess, that, too, consists of a semi-cylindrical wall 24a of the inner wall of the passage of gear 24, through which shaft 21 is inserted. Therefore key 49 is made to turn by gear 24 and transmits such movement to shaft 21.

As can best be seen in FIGS. 4a and 4b, the wall of the axial passage of gear 24 shows a series of recesses 24a, each consisting of a sector of fundamentally cylindrical wall; these recesses are connected to one another by means of chamfered ribs 24b.

When the condition of pin 39 is changed from that shown in FIG. 4a into that in FIG. 4b, mobile key 49 is engaged with smaller-diameter part 48 of pin 39. As a consequence of the rotation of gear 24 mobile key 49 is moved radially towards pin 39, disengaging itself from recess 24a where it was. This movement is brought about by ribs 24b, which, by acting on semi-cylindrical wall 49a of mobile key 49, push the latter radially towards the inside of shaft 21. This movement is possible since mobile key 49 does not hinder it in any way, because it is in contact with smaller-diameter part 48 of pin 39. In this condition, when mobile key 49 is disengaged from gear 24, the rotation movement of the latter is no longer transmitted to shaft 21, which consequently stops turning.

It is also to be stressed that it is spring 41 that accounts for the radial movement towards the outside of drum 7 of pin 39. That is important since the coupling of mobile key or keys 49 with one or more recesses 24a of gear 24 is carried out elastically, thus preventing the device from binding.

Also the shape of the part of mobile key 49 that engages itself with pin 39 is noteworthy; it can be seen in details in the enlarged particular, outside FIG. 4b. The part just mentioned of mobile key 49, part that is characterized by symbol 49b and a side view of which can be found in FIGS. 4a and 4b, is fundamentally semi-circular, but it has no sharp edge: on the contrary, it is saddle-shaped, i.e. its concave central part which engages itself with pin 39 is flared on both sides towards end 49a. The mobile contact between key 49 and pin 39 is kept stable and unbound thanks to the aforesaid shape, together with the flared segment connecting part 48 of pin 39 to the rest of the pin itself.

A basically ring-shaped cam 54 accounts for the movement required to take pin 39 from the position in which mobile key 49 engages itself with its greater-diameter part (shaft 21 turning) into that in which the key engages itself with small-diameter part 48 of pin 39 (shaft 21 not turning) and for the reverse movement as well. Cam 54 is fixed to a base, not shown, and is basically on the same axis as drum 7, as as can be seen in FIGS. 1 and 2.

In the embodiment shown, cam 54 is provided with a recess 55 on its inner face, allowing pin 39, thanks to spring 41, to move towards the outside of drum 7, so that mobile key 49 can disengages itself from smaller-diameter part 48 of pin 39 and can engage itself with its greater-diameter part, thus keeping bevel gear 24 turning with shaft 21. In such a way control unit 20, wheel 46 of which moves in recess 55, is operated and the corresponding bar-pusher pushes the length of bar required forward.

When the aforesaid unit has gone beyond recess 55, thus returning in the steady-diameter part of cam 54, pin 39 is made to go back into hollow shaft 21, and mobile key 49, engaging itself with smaller-diameter part 48 of pin 39 again, comes out of recess 24a of gear 24, thus disengaging gear 24 from shaft 21, which is not working now.

In the embodiment shown, cam 54 has just one recess 55, which means that six control units 20 are operated one by one. However, it goes without saying that more recesses 55 can be scheduled, which will be properly offset in order to operate more than one control unit 20 simultaneously.

To secure it to its fixed base (not shown in the picture), cam 54 is furnished with slots 56, meant for its adjustment.

Particularly in FIG. 2 it can see that, corresponding to gears 36, which transmit movement to the bar-pushers, there are some slits 57 on front flange 9. These slits are basically parallel to shaft 21 and fundamentally as long as ribs 35. So, when gears 36 are moved so as to adjust their centre distance to that of the metal bar guides, the movement transmitting chains are moved correspondingly in slits 57, thus permitting to adjust the device of this invention according to the lathe centre distance, no matter what value it may be.

Figure 5:
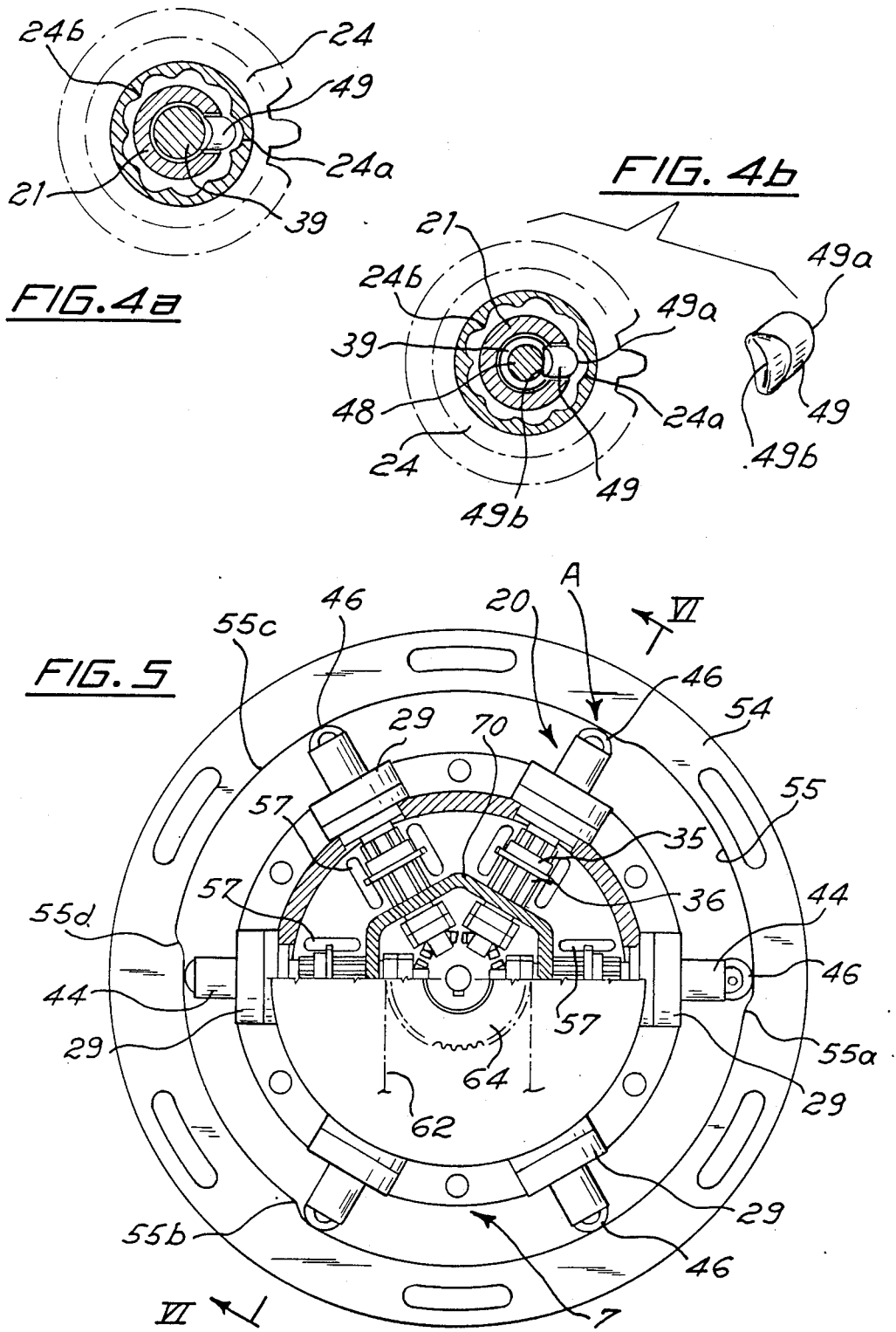
FIGS. 5 and 6 are a front view and a cross section view of a first modification of the device subject of this invention.
Figure 6:
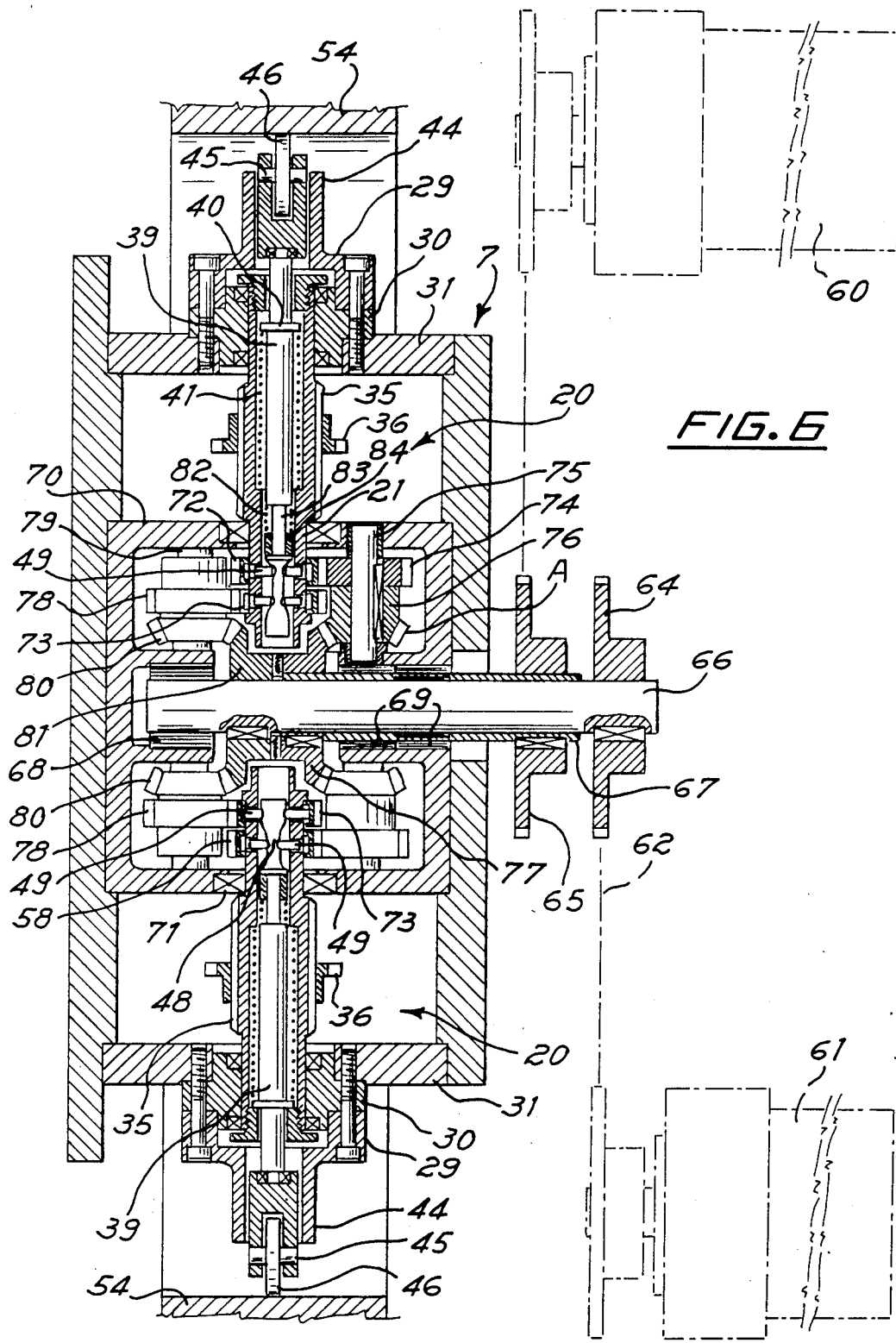

FIGS. 5 and 6 show another embodiment of the device of this invention, namely in FIG. 5 this embodiment is illustrated in the same view as in FIGS. 1 and 2, i.e. from the rear side of the device, while FIG. 6 is a view according to section VI—VI of FIG. 5.

The embodiment shown in the aforesaid figures consists mainly of a more sophisticated device than that in FIGS. 1 through 4, namely of a device allowing simultaneous and independent control of two bar-pushers and to get two different-length feeds by adjusting and properly positioning the known bar feed stops in the lathe.

In FIGS. 5 and 6 the same elements as in FIGS. 1 through 4 are characterized by the same reference numbers.

This embodiment accounts for the simultaneous reverse movement of two bar-pushers as well.

In this case the device includes two oleodynamic-type control units 60 and 61 with clutch, each of which is connected through chains 62 and 63 respectively to gears 64 and 65 splined to shafts 66 and 67 having the same axis and able to turn independently of ach other. Shaft 66, i.e. the inner one, is longer and projects outside shaft 67 as against drum 7. Both shafts 66 and 67 are supported in the known way by oilless bushings 68 and 69, placed between them and the supporting walls of a box element 70, situated and fixed inside drum 7. The box element 70 allows to apply a kinematic mechanism to transmit motion from shaft 66 and 67 to different control units 20.

Splined shafts 21 are supported not only by drum 7, but also by box element 70, they cross its side wall and are supported by bearings 71, allowing them to turn.

The part of shafts 21 inside box element 70 is provided with a pair of annular gears 72 and 73, the shape of the inner longitudinal passage of which is basically the same as that of bevel gear 24 in the first embodiment for the control of the movement of mobile key 49. Therefore, even if not shown, this passage is so shaped as shown in FIGS. 4a and 4b.

There are four mobile keys 49 for each pin 39 and they are situated in appropriate passages in splined shaft 21 in such a way that two keys are opposite to the other two. Smaller-diameter part 48 of pin 39 is so long as to allow three different engaging possibilities for mobile keys 49 with pin 39 so as to connect shaft 21 with or disconnect it from either of motors 60 and 61.

Particularly in FIG. 6 it can be seen that each one of gears 72 meshes with a gear 74 splined to a shaft 75 supported by the outer wall of box element 70 and by one of its opposite inner walls so that it can turn. A bevel gear 76 is splined or fitted to shaft 75, and in turn gear 76 meshes with a circular face gear 77, which is fitted to outer shaft 67, thus getting movement from first control unit 60.

Each of gears 73 meshes with a gear 78 fitted to a shaft 79 supported by box element 70 almost in the same way as shaft 75, to which a bevel gear 80 is splined. This bevel gear meshes, in turn, with a circular face gear 81 that is fitted to inner shaft 66 and gets therefore motion from second control unit 61.

In this case the shape of pin 39 is slightly different from that in the first embodiment. In fact, as can be seen, particularly in FIG. 6, it has a second step-shaped part 83, against which a spring 82 engages itself. The other end of spring 82 engages itself with a steel sleeve 84 applied on pin 39. As for the rest, it is the same as what already described, particularly as far as the flared parts connecting reduced-diameter area 48 with the rest of pin 39 are concerned.

In particular, spring 82 is meant to perform, during one of the two possible engaging phases, the same function as spring 41 in the previous embodiment.

Also in this case the number of mobile keys is not limiting and it is possible to increase it according to the need.

Now are explained the various possibilities of mating splined shaft 21 to the various gears of the kinematic transmission mechanism in order to get the three working conditions of the same shaft, namely connection with either motor 60 or 61, or shaft not working.

With reference to FIG. 6, upper control unit 20 is not working, since smaller-diameter part 48 of pin 39 is engaged with all four mobile keys 49 and, therefore, both gear 72 and gear 73 are disengaged from shaft 21. On the contrary, lower control unit 20 is turning, being operated by motor 61.

This happens because, while two mobile keys 49 are engaged with smaller-diameter part 48, the other two are engaged with the greater-diameter part of pin 39. More precisely the engaged keys are those concerning gear 73, which will therefore make shaft 21 turn. Gear 73 is in mesh with gear 78, which gets movement through bevel gear 80 from gear 81 splined to inner shaft 66. Therefore shaft 21 in lower control unit 20 will be operated by motor 61.

The third possible working condition not shown turns out to be clear referring to control unit 20 in the upper part of FIG. 6 and supposing that pin 39 in this unit is lowered, i.e. radially moved towards the inside of drum 7. In this way a couple of mobile keys 49, i.e. those placed in the lower part of the picture, go on being engaged with smaller-diameter part 48 of pin 39, while the other two engage themselves on sleeve 84, the diameter of which is the same as that of pin 39, so gear 73 will be disengaged from shaft 21, while gear 72 is made integral with shaft 21 and makes it turn. Gear 72 is in mesh with gear 74 and gets movement through bevel gear 76 from circular gear 77 splined to outer shaft 67. In this case shaft 21 will get movement from other drive motor 60, which can be supposed to turn in the same sense as drive motor 61. What said means that two different control units 20, the first operated by drive motor 61 and the second by drive motor 60, will rotate simultaneously.

Also in this case an annular cam 54 accounts for the aforesaid movements of pins 39 in control units 20. This cam is situated around drum 7, but it is furnished with a series of recesses instead of only one recess as in the previous embodiment. However, by "a series of recesses" we do not mean a series of "identical" recesses as said in relation to the first embodiment, but fundamentally step-shaped recesses of such a kind as to get the three positions first above mentioned for various pins 39.

With particular reference to FIG. 5 cam 54 has, in this embodiment, a first recess 55 as in the first embodiment, followed, after a curvilinear step 55a, by a greater thickness or width zone of cam 54, after which there is again a curvilinear step 55b and then a zone with a thickness greater than the previous one.

Last zone 55c of cam 54 completing the cam circumference is even less thick, after a curvilinear step 55d. To realise clearly how this embodiment of the device works, it is enough to start with control unit 20 pointed at by arrow A in FIG. 5 and to go on following the revolution sense of the same, which is engaged with cam 54.

When aforesaid unit 20 gets into part 55, its pin 39 will be in the same condition as in control unit 20 in the lower part of FIG. 6, i.e. shaft 21 being connected to drive motor 61, as described hereinbefore.

When the same unit gets to the following zone after step 55a, its pin is in the middle condition corresponding to that of control unit 20 in the upper part of FIG. 6, where shaft 21 is not turning.

Finally, when the same unit gets to the following zone of cam 54 after step 55b, its pin 39 is taken into the position of maximum insertion in shaft 21, i.e. into the position not shown in FIG. 6, but described referring to it.

In this case shaft 21 is connected to drive motor 60.

Then, after curvilinear step 55d, control unit 20 gets to area 55c of cam 54, returning into the condition it was in, when moving along the area included between steps 55a and 55b.

It is clear that the embodiment shown is only an example of how to make two bars be fed simultaneously and independently. It is possible to choose the feed value required by adjusting the corresponding lathe stops scheduled in any known way.

Figure 7:
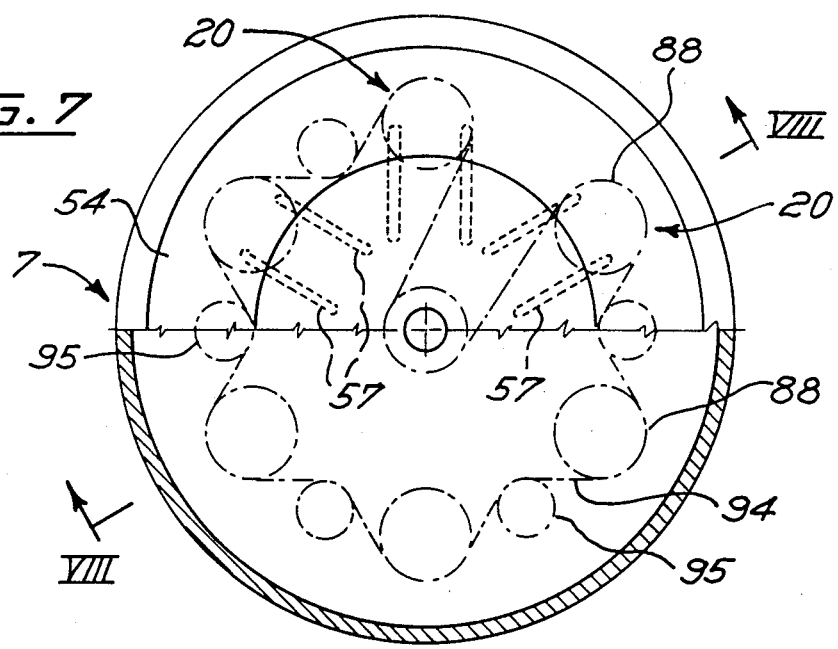
FIGS. 7 and 8 are a front view and a cross section view of a second modification of the invention.
Figure 8:
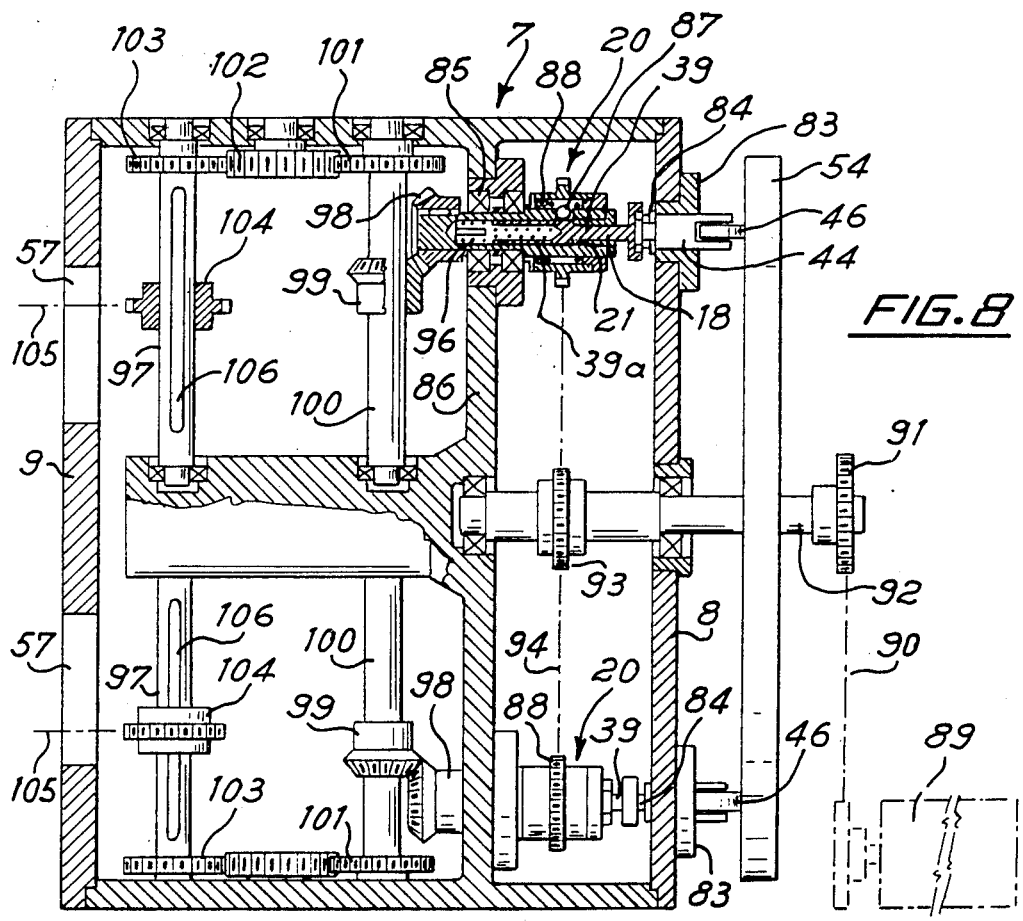

Referring now to FIGS. 7 and 8, the third possible embodiment of the device of this invention is described. FIG. 7 shows a schematic rear view of the device, while FIG. 8 shows the device according to section VIII—VIII of FIG. 7. Also in this case the device consists of a fundamentally cylindrical revolving drum, marked with 7, inside which different control units 20 are not placed in a star-like manner as before, but they are arranged parallel to one another along a circumference, as shown schematically in FIG. 7. Each one of control units 20 is equipped with engaging and disengaging contrivances to be operated and stopped, as in the previous embodiments. In the present embodiment, these engaging and disengaging contrivances are ball clutches, which are operated through the combined action of the rotation of drum 7 and the engagement with a cam, that is marked with 54 also in this case.

Unlike in the other embodiments, cam 54 is a face cam and is placed opposite to one of the faces of drum 7, namely to that from which the cam followers of control units 20 project. In FIG. 8 the recesses and the projecting parts of cam 54 cannot be seen, but they are supposed to be in the same positions as in the previous figures.

Each control unit 20 is engaged with cam 54 through a wheel 46; this wheel turns on element 44, which slides inside a bushing 83 integral with drum 7 and engages itself with a thrust bearing 84. On the opposite face this thrust bearing engages itself with the end of a pin 39 sliding inside a shaft 21. Describing this construction variation, the same reference numbers have been used for those elements that are basically the same or that perform the same functions as in the previous embodiments.

Shaft 21 is supported by bearings 85 so that it can turn. These bearings are scheduled on an inner wall 86 of drum 7.

Pin 39 consists of a greater-diameter part 39a and a smaller-diameter part 48. In this way, through the sliding of pin 39 inside shaft 21, a ball 87 of a ball clutch provided with an operating spring 88 can get in through a hole in shaft 21 and not project out of this hole or, when it engages itself with greater-diameter part 39a of pin 39, it can project from this hole, as shown in particular in FIG. 8. In such position ball 87 engages shaft 21 with a gear 88, making shaft 21 turn.

Various gears 88 get movement from a drive motor 89, which is provided with a chain 90, winding around a gear 91 splined to a drive shaft 92.

Inside drum 7 a gear 93 is splined to drive shaft 92, and from gear 93 all gears 88 get movement through a continuous closed chain 94. Idle gears 95 are scheduled to keep chain 94 constantly under tension.

Control units 20 are operated and stopped basically in the same way as in the previous embodiments through pins 39 and ball clutches 87.

In fact, through its projecting parts cam 54 will account for making pin 39 go back. This pin (see FIG. 8) will move towards the left side, thus stopping control unit 20, which will be then operated again through spring 96, acting on a hollow part of pin 39 and taking it back towards the outside of drum 7, when wheel 46 meets a recess on cam 54.

The turning movement of shaft 21 is transmitted to the real drive shafts of the bar-pusher marked with 97 by means of a kinematic mechanism described in the following, with reference to a control unit 20.

A gear 98 is splined to shaft 21 and is in mesh with another gear 99, which is, in turn splined to a turning shaft 100 on drum 7 in the way shown, its longitudinal axis being perpendicular to that of shaft 21.

A gear 101 is splined to shaft 100 and is in mesh with an idle gear 102, which in turn is engaged with gear 103 splined to drive shaft 97. A gear 104 is splined to shaft 97 and operates its corresponding bar-pusher through a chain 105.

Trough a spline 106 provided on shaft 97 (FIG. 8), gear 104 can be moved and secured in different positions. As a consequence, drum 7 is provided with openings 57 on its front wall 9, which allow the corresponding movements of chains 105.

The way in which gears 104 are secured in the established positions on shafts 97 is known, therefore it is not shown.

As follows from what said up to now, the functioning principle of this embodiment of the device of this invention is basically the same as that of the previous embodiments, so that it is not described.

The descriptions of the different embodiments of the device highlight the advantages it offers and its great versatility, particularly as far as the second embodiment is concerned. Besides what said hereinbefore about the operation of this embodiment, it is to be noted that drive motors 60 and 61 can be equipped in any known way with speed variators or reversing gears, so that to have a chance to further increase the possibilities of changes in the working conditions of the device object of this invention.

It goes without saying that also variations of and/or changes in the device can be carried out, even the aforesaid variations and changes being covered by the rights coming from this invention.

What we claim is:

1. A bar-feed control device for the feeding of an automatic multiple-spindle lathe, including a drum that rotates together with equipment for guiding the bars to the lathe said drum having a series of units controlling the bar feed, each unit comprising a rotatable hollow shaft (21) carrying a drive gear (36) splined to its outer surface for rotation therewith, drive means (24) associated with said shaft, a pin (39) slidingly movable within said hollow shaft, means (49, 24a) for coupling said drive means to said shaft through the intermediation of said pin, and cam means (54) for moving said pin into a first position for connecting said drive means to said shaft through said coupling means and into a second position disengaging said coupling means from said drive means.

2. Device according to claim 1, characterized by the fact that said shaft is connected to two gears, each of which can be connected to the shaft independently of the other through its own coupling means, the two gears being connected to two separate drive motors.

3. Device according to claim 2, characterized by the fact that each one of the gears is connected to its own motor by means of a kinematic idle mechanism, for each of which a separate drive shaft is provided.

4. Device according to claim 3, characterized by the fact that each of the kinematic idle mechanism ends with a gear, these two gears being splined to two separate drive shafts, coaxial and independently rotatable.

5. Device according to claim 1, characterized by the fact that the cam means is furnished with at least one recessed area, to allow at least one movement of the pin radially towards the outside of the drum.

6. Device according to claim 1, characterized by the fact that the cam means has at least three different surface depths to allow three positions of the pin, each of which corresponds to a different coupling arrangement.

7. A control device according to claim 1 wherein said units are radially disposed in a plane perpendicular to the longitudinal axis of the bar-feeding equipment and said cam being concentric with said drum.

8. A control device according to claim 1 wherein the control units are disposed in a parallel array inside the drum and their longitudinal axes are parallel to the longitudinal axis of the bar-feeding equipment and said cam being of annular configuration and having its operative surface perpendicular to the longitudinal axes of said units.

9. A control device according to claim 1 wherein one end of said pin is equipped with a cam follower for engagement with said cam surface.

10. A control device according to claim 9 wherein the pin is urged into engagement with said cam means by elastic means interposed between said shaft and said pin.

11. A control device according to claim 1 wherein said pin has a reduced-diameter part and a greater-diameter part and said coupling means comprises a pawl in contact with the surface of said pin and slidably movable in an aperture provided in said shaft for engagement and disengagement with said drive means in accordance with the positioning of said parts of said pin.

12. A control device according to claim 11 wherein said drive means comprises a gear in concentric relation to said shaft and having a recess in its inner surface.

13. Device according to claim 12, characterized by the fact that, when the pawl is engaged with the greater-diameter part of the pin, it is kept partially projecting from a hole in the shaft, the projecting part engaging itself with said recess in said gear.

14. Device according to claim 13, characterized by the fact that the gears have a series of inner recesses adapted to receive a part of the pawl, and said recesses being connected by chamfered ribs.

15. A device according to claim 12, characterized by the fact that, when the pawl is engaged with the smaller-diameter part of the pin, it is positioned within the aperture in the shaft such that it is disengaged from said gear.

16. A control device according to claim 11, characterized by the fact that the surface of said pawl which engages the pin is basically saddle-shaped and the surface which engages the gear is basically round shaped.

17. A control device according to claim 1 in which said shaft is provided on its outer surface with a series of longitudinal ribs and said drive gear is provided with inner recesses in correspondence with the ribs to permit movement of said gear into a plurality of positions on said shaft.

18. Device according to claim 17, characterized by the fact that corresponding to the longitudinal ribs of the shafts, the drum is provided with slits for the passage of the chains controlling the bar feed, the aforesaid slits being basically parallel to the shaft.

19. A control device according to claim 1 wherein said drive means for each of said units is connected to a central gear connected to a drive motor.

* * * * *